United States Patent [19]

Akiyama et al.

[11] 3,713,881

[45] Jan. 30, 1973

[54] PAPER COATING COMPOSITIONS AND PAPER COATED THEREWITH

[75] Inventors: Toyomi Akiyama, Sakai, Osaka; Mitsuru Kondo, Hyogo; Satoshi Dotani, Toyonaka, Osaka, all of Japan

[73] Assignee: Kanzaki Paper Mfg. Co., Ltd., Tokyo, Japan

[22] Filed: Sept. 2, 1969

[21] Appl. No.: 854,767

[30] Foreign Application Priority Data

Sept. 2, 1968  Japan..............................43/62891

[52] U.S. Cl.......117/155 UA, 117/156, 117/161 UE, 260/91.3 VA
[51] Int. Cl..............................................D21h 1/32
[58] Field of Search.........117/155 UA, 156, 161 UE; 260/91.3 VA

[56] References Cited

UNITED STATES PATENTS

| | | | |
|---|---|---|---|
| 2,759,847 | 8/1956 | Frost et al. | 117/155 X |
| 2,919,205 | 12/1959 | Hart | 117/155 X |
| 3,218,191 | 11/1965 | Domanski | 117/155 X |
| 3,223,579 | 12/1965 | Dorland et al. | 117/155 X |
| 3,228,327 | 1/1966 | Heffner | 117/155 X |
| 3,329,525 | 7/1967 | Powers | 117/155 |
| 3,375,121 | 3/1968 | Bildusas | 117/155 X |
| 3,476,582 | 11/1969 | Imoto et al. | 117/155 X |
| 3,477,970 | 11/1969 | Beeman | 117/155 X |
| 3,481,764 | 12/1969 | Matsumoto et al. | 117/155 X |
| 3,316,190 | 4/1967 | Suzumura et al. | 260/32.2 |
| 3,324,057 | 6/1967 | Suzumura et al. | 117/155 X |
| 3,365,408 | 1/1968 | Ohara | 260/91.3 X |
| 3,148,166 | 9/1964 | Suzumura et al. | 260/91.3 X |

*Primary Examiner*—William D. Martin
*Assistant Examiner*—M. R. Lusignan
*Attorney*—Cushman, Darby & Cushman

[57] ABSTRACT

An aqueous pigment coating composition essentially containing water-soluble modified polyvinyl alcohol as a coating binder having one kind or plural different kinds of substituent group selected from cyanoethyl group, carbamoylethyl group, carboxyethyl group, sodium carboxyethyl group, potassium carboxyethyl group, ammonium carboxyethyl group, carboxymethyl group, sodium carboxymethyl group, potassium carboxymethyl group and ammonium carboxymethyl group. The coating color has a proper flow property and provides a pattern-free and smooth surface onto a coated paper.

3 Claims, No Drawings

PAPER COATING COMPOSITIONS AND PAPER COATED THEREWITH

Paper coating compositions for high quality printing paper generally consist of mineral pigments suspended in an aqueous solution or dispersion of an adhesive. Mineral pigments for this use are usually selected from a group consisting of kaolin, china clay, titanium dioxide, calcium carbonate, satin white and the like. The most common binders for this use are casein, soybean protein, synthetic resin emulsion such as styrene-butadiene polymer, acrylic resins, polyvinyl acetate and modified starch. Combinations of adhesives are sometimes used.

The requirements of a coating composition for coating paper to be used for high quality printing are quite severe. Of utmost importance, the dried coating must serve a smooth printing surface having uniform and controllable ink acceptance. Secondly, the coating film must have sufficient internal strength and must be bonded to a cellulosic fiber of the paper substrate so as to resist flaking and picking during handling and, more particularly, during the high speed printing process. And further, the coating must provide opacity and brightness to the sheet and should accept a gloss when supercalendered. In addition to the requirement described above pertaining to the final properties of the coated paper, the coating composition must possess suitable rheological properties for proper application from the coating station to the paper surface.

Coating binders exert a tremendous influence on the properties of both the coating composition and the final coated paper. The binder in the pigment coating (1) provides a suspending medium for the pigment; (2) imparts the desirable rheological properties to the coating composition (3) serves as a binder for the pigment particles in the dried coating; (4) binds the pigment particles to the base; (5) provides a smooth and continuous printing surface with uniform and controllable ink acceptance.

One most important property of the coating binder is the pigment bonding strength, since this property determines the amount of binder necessary to hold the pigment on the paper. Each grade of coated paper has a definite strength requirement, and the amount of binder necessary in the coating to meet this requirement is determined by the pigment bonding strength of the binder. The higher the pigment bonding strength of the binder, the higher the ratio of pigment to binder that is possible, and the better the opacity, brightness and gloss of the paper. If the ratio of binder to pigment is too high, the quality of the paper is poor. Another important property of the coating binder is the proper rheological property to the coating composition as well as pigment bonding strength. Therefore, great care must be taked to select the proper pigment and binder and to use them together in proper balance to obtain the desired coated product. The binders commonly used heretofore are normally employed in amounts of 10-30 parts binder per 100 perts of pigment.

Polyvinyl alcohol (hereinafter preferred to as PVA) is a very powerful pigment binder. This means that a relatively small amount of PVA is required to obtain a coating that adequate strength to be commercially useable. Generally, the higher the degree of polymerization of PVA the stronger the bonding strength becomes and the viscosity is increased at the same time. Especially, PVA having average degree of polymerization ($\bar{p}$) of more than 800 and more than 88 percent hydrolysis is used for proper bonding strength. For example, the PVA having average degree of polymerization of 1700 and 99-100 percent hydrolysis enables one to obtain a similar bonding strength with only one-third of the quantity which would be necessitated by casein or soy protein and one-fourth of the quantity necessitated by starch. Since the amount of PVA required is small, coatings can be prepared which have excellent optical properties such as opacity, brightness and gloss.

In spite of the fact that PVA is a superior pigment binder in some respects, PVA has heretofore been entirely unsatisfactory as a paper coating pigment binder because of certain deleterious characteristics. As a matter of fact, PVA is rarely used for the production of high quality printing coated paper, largely because this does not impart the suitable flow properties to the coating composition. During the mill operation, the coating color is subject to the wide range of shear stresses such as kneading, mixing, pumping up, screening and coating. It is said that the shear stress is about $10^5 sec^{-1}$. at roll coater and $10^6 sec^{-1}$. at high speed blade coater. Therefore, the coating color is supposed to maintain a suitable flow properties in the above shearing condition.

Many attempts have been made to apply aqueous PVA pigment coating color to paper with various types of coating equipment including the roll coater, offset gravure coater, air knife coater and other coaters used in the art. These attempts have been unsuccessful because of the production of a severe pattern (like orange peel) in the coating as it transfers from the coater to the paper. This results in a coating which is rough or streaked. These defects are not smoothed appreciably by supercalendering. The severe pattern makes it impossible to obtain a satisfactory printing job over these coatings. These defects in flow property is increased with the higher degree of polymerization of PVA, and with the higher solids content of coating colors. So, total solids content of coating color is relatively low, as we often find in the successful commercial production. For example, U. S. Pat. No. 2,487,448 discloses coating compositions consisting of 50-70 percent kaolinitic, 15-25 percent by weight of PVA, and 15-25 percent of unswollen starch. Such compositions are representative of what has been used widely in the industry to manufacture laminated paper and paper board having excellent dry bond strength which do not lose dry bond strength after soaking in water, these coatings are generally applied from an aqueous dispersion at a solids content of about 30 percent by weight. These low-solids coating do not permit us to employ a high speed air-knife coater, roll coater or blade coater for the production of high quality printing coated papers. The recent trends for the paper industry in regard to coatings are the high speed coating with the use of high solids coating. In this respect, the flow properties of PVA are regarded as a serious problem interrupting its commercial usage as coating binder. Thus, it will be readily recognized that the development of a commercially acceptable PVA for pigment coating color would represent a significant contribution to the paper coating art. In order to improve the flow property of coating color, various kinds of modification of PVA have so far been tried. However, these attempts have not yet shown satisfactory results in commercial production since this tends to reduce bonding strength in spite of the improvement in flow property. We tried our best and succeeded in improving the flow property without reducing the bonding strength.

An object of this invention is to provide improved paper coating composition. Another object is to provide an improved paper coating composition which can be applied to paper and paper coating to produce a smooth, pattern free coating. A still further object is to provide an improved paper coating composition which can be applied from a relatively high solids content aqueous solution. Another object is to provide an economical coating composition with less binder ratio by using PVA as a single form or as a mixed form with other binders. Still another object is to provide a high quality printing coated paper having an improved optical property. Other objects will be apparent from the following description of this invention.

Aforementioned objects can be achieved by the use of watersoluble modified PVA with hydroxyl groups (—OH) partly replaced by such substituent groups selected from cyanoethyl ether group(—O—CH$_2$CH$_2$CN), carbamoylethyl ether group (—O—CH$_2$CH$_2$CONH$_2$), carboxyethyl ether group (—O—CH$_2$CH$_2$COOH), sodium carboxyethyl ether group (—O—CH$_2$CH$_2$COONa), potassium carboxyethyl ether group (—O—CH$_2$CH$_2$COOK), ammonium carboxyethyl ether group (—O—CH$_2$CH$_2$COONH$_4$), carboxymethyl ether group (—O—CH$_2$COOH), sodium carboxymethyl ether group (—O—CH$_2$COONa), potassium carboxymethyl ether group (—O—CH$_2$COOK), ammonium carboxymethyl ether group (—O—CH$_2$COONH$_4$).

To produce this water-soluble modified PVA, we often react PVA with acrylonitrile, acrylamide, monochloric acetic acid, β-propiolactone or alkylester of acrylic acid. For example, the reaction between PVA and acrylonitrile is as shown below.

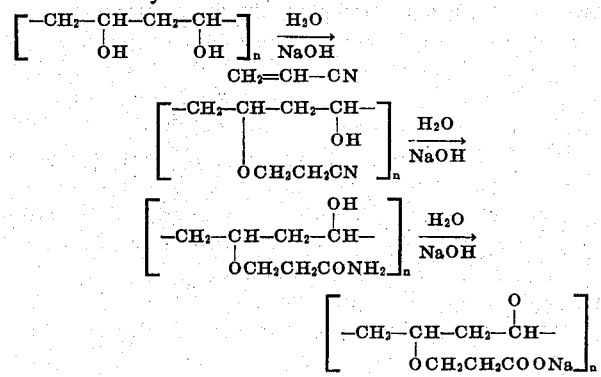

And the reaction between PVA and acrylamide is as shown below.

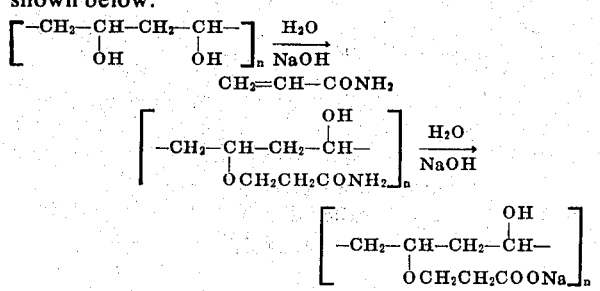

It will be understood from the above that modified PVA having one kind of substituent group or having simultaneously plural and different kinds of substituent group can respectively be produced with each stage of reaction. The degree of substitution of modified PVA of the invention shows the total quantity of one kind or plural different kinds of substituent groups of modified PVA. For example, the term 4 mol % in total degree of substitution indicates that 4 percent of hydroxyl groups of PVA have been replaced by one kind or plural different kinds of substituent groups. The desirable degree of polymerization ($\bar{p}$) of modified PVA of the invention is at more than 800, which is understood as the most effective range where such characteristic features as bonding strength is clearly shown. And total degree of substitution of modified PVA in the invention shall be in the range between about 2 and 20 mol %.

Modified effect can not been recognized under less than 2 mol % condition., and pick resistance of coating during high speed printing operation will be badly affected under more than 20 mol % condition, although flow property will be much improved. The most desirable degree of substitution is, therefore, in the range between about 3 and 15 mol %.

Standard pigments known in the art which are suitable for use in coating colors may be used. Kaolin or clay is generally preferred because of its desirable pigment characteristics and relatively inexpensive cost. Other pigments such as calcium carbonate, titanium dioxide, aluminum hydroxide, talc, satin white and etc. may also be used.

A typical example of an improved coating composition of this invention suitable application onto paper for high quality printing paper is shown below.

Example 1

| Components | Parts by Solid Weight |
|---|---|
| Kaolin | 100.0 |
| Modified PVA ($\bar{p}$=1700, 98-100% hydrolysis, total degree of substitution of 10 mol %; cyanoethyl group 10 mol %) | 5.0 |
| Dow-620 (styrene-butadiene polymer Dow Chemical Co.) | 6.0 |
| Tetrasodium pyrophosphate | 0.3 |
| Sufficient water to dilute the coating to 43% total solids content. | |

This coating color, formulated at about 43 percent solids content in water, is suitable for application by air-knife coater.

Other additives may be used in the formulations to provide specific effects. For example, plasticizer, antiformer, insolubilizer and dyes are often used in these coating colors. Any of these and other materials conventionally used in paper coating may be added to the coating color of the invention.

Coating colors of the invention may be prepared by dissolving the modified PVA in water. A high solid pigment dispersion is separately prepared and then mixed with the PVA solution. In another way, it is possible to make the color by adding the dry modified PVA directrly to the pigment dispersion and then heating to dissolve the PVA. This technique of cooking the PVA in the presence of the pigment substantially sometimes increases the binding power of the PVA.

Example 2

| Components | Parts by Solid Weight |
|---|---|
| Kaolin | 100.0 |
| Modified PVA ($\bar{p}$=1700, 98-100% hydrolysis, total degree of substitution of 11 mol %; carbamoylethyl group 8 mol % carboxyethyl group 3 mol %) | 8.0 |
| Tetrasodium pyrophosphate | 0.3 |
| Sufficient water to dilute the coating to 60% total solids content. | |

This coating color is formulated at about 60% solids content in water and is suitable for application by trailing blade coater or roll coater.

In accordance with the above examples, the other coating compositions of the invention are quoted as follows:

Example 3

| Components | Parts by Solid Weight |
|---|---|
| Kaolin | 80.0 |
| Calcium Carbonate | 20.0 |
| Modified PVA ($\bar{p}$=1700, 98-100% hydrolysis, total degree of substitution of 11 mol %; cyanoethyl group 5 mol % carbamoylethyl group 2 mol % sodium carboxyethyl group 4 mol %) | 5.0 |
| Dow-620 Latex | 5.0 |
| Sodium hexametaphosphate | 0.3 |
| Sufficient water to dilute the coating to 60% total solids content. | |

Example 4

| Components | Parts by Solid Weight |
|---|---|
| Kaolin | 100.0 |
| Modified PVA ($\bar{p}$=1700, 90% hydrolysis, total degree of substitution of 7 mol %; carbamoylethyl group 3 mol % sodium carboxyethyl group 4 mol %) | 5.0 |
| Dow-620 Latex | 5.0 |
| Sodium hexametaphosphate | 0.3 |
| Sufficient water to dilute the coating to 60% total solids content. | |

Example 5

| Components | Parts by Solid Weight |
|---|---|
| Kaolin | 100.0 |
| Modified PVA ($\bar{p}$=900, 98-100% hydrolysis, total degree of substitution of 5 mol %; cyanoethyl group 1 mol % carbamoylethyl group 1 mol % carboxyethyl group 3 mol %) | 7.0 |
| Dow-620 Latex | 5.0 |
| Sodium hexametaphosphate | 0.3 |
| sufficient water to dilute the coating to 60% total solids content. | |

Example 6

| Components | Parts by Solid Weight |
|---|---|
| Kaolin | 80.0 |
| Calcium carbonate | 20.0 |
| Modified PVA ($\bar{p}$=1700, 98-100% hydrolysis, total degree of substitution of 4 mol %; sodium carboxymethyl group 4 mol %) | 5.0 |
| Dow-620 Latex | 5.0 |
| Sodium hexametaphosphate | 0.3 |
| Sufficient water to dilute the coating to 60% total solids content. | |

Example 7

| Components | Parts by Solid Weight |
|---|---|
| Kaolin | 100.0 |
| Modified PVA ($\bar{p}$=1700, 98-100% hydrolysis, total degree of substitution of 5 mol %; sodium carboxyethyl group 5 mol %) | 5.0 |
| Dow-620 Latex | 5.0 |
| Sodium hexametaphosphate | 0.3 |
| Sufficient water to dilute the coating to 60% total solids content. | |

Example 8

| Components | Parts by Solid Weight |
|---|---|
| Kaolin | 80.0 |
| Calcium carbonate | 20.0 |
| Modified PVA ($\bar{p}$=1700, 98-100% hydrolysis, total degree of substitution of 15 mol %; carbamoylethyl group 15 mol %) | 5.0 |
| Dow-620 Latex | 5.0 |
| Sodium hexametaphosphate | 0.3 |
| Sufficient water to dilute the coating to 55% total solids content. | |

Example 9

| Components | Parts by Solid Weight |
|---|---|
| Kaolin | 90.0 |
| Satin white | 10.0 |
| Modified PVA ($\bar{p}$=1300, 95-100% hydrolysis, total degree of substitution of 5 mol %; cyanoethyl group 2 mol % carbamoylethyl group 1 mol % sodium carboxyethyl group 2 mol %) | 5.0 |
| Dow-620 Latex | 8.0 |
| Sodium hexametaphosphate | 0.3 |
| Sufficient water to dilute the coating to 40% total solids content. | |

Example 10

| Components | Parts by Solid Weight |
|---|---|
| Kaolin | 90.0 |
| Satin white | 10.0 |
| Modified PVA ($\bar{p}$=1700, 98-100% hydrolysis, total degree of substitution of 8 mol %; carbamoylethyl group 4 mol % sodium carboxyethyl group 4 mol %) | 5.0 |
| Dow-620 Latex | 8.0 |
| Sodium hexametaphosphate | 0.3 |
| Sufficient water to dilute the coating to 40% total solids content. | |

Aforementioned examples are as per the singular use of modified PVA or its combined use with synthetic resin emulsion. The modified PVA of the invention can also partially replace the coating binders of conventional coating color compositions such as pigment-casein coating, pigment-casein-synthetic resin emulsion coating, pigment-starch coating, pigment-starch-synthetic resin emulsion coating. This will be economical in that the quantity of binder can be reduced to some extent. The following composition can be prepared as examples:

Example 11

| Components | Parts by Solid Weight |
|---|---|
| Kaolin | 90.0 |
| Satin white | 10.0 |
| Modified PVA ($\bar{p}=1700$, 98–100% hydrolysis, total degree of substitution of 11 mol %; carbamoylethyl group 8 mol % sodium carboxyethyl group 3 mol %) | 5.0 |
| Nylgum A-220 (Phosphated Starch, Scholten N. V. Netherland) | 2.0 |
| Dow-620 Latex | 5.0 |
| Sodium hexametaphosphate | 0.3 |
| Sufficient water to dilute the coating to 57% total solids content. | |

This coating color is formulated at about 57 percent solids content in water and is suitable for application by blade coater with on-machine coating.

Example 12

| Components | Parts by Solid Weight |
|---|---|
| Kaolin | 90.0 |
| Satin white | 10.0 |
| Modified PVA ($\bar{p}=1700$, 98–100% hydrolysis, total degree of substitution of 8 mol %; carbamoylethyl group 4 mol %) sodium carboxyethyl group 4 mol %) | 6.0 |
| Nylgum A-220 | 10.0 |
| Sodium hexametaphosphate | 0.3 |
| Sufficient water to dilute the coating to 42% total solids content. | |

Example 13

| Components | Parts by Solid Weight |
|---|---|
| Kaolin | 80.0 |
| Calcium carbonate | 20.0 |
| Modified PVA ($\bar{p}=1700$, 99.0% hydrolysis, total degree of substitution of 8 mol %; carbamoylethyl group 4 mol % sodium carboxyethyl group 4 mol %) | 5.0 |
| Casein | 2.0 |
| Dow-620 Latex | 9.0 |
| Sodium hexametaphosphate | 0.3 |
| Sufficient water to dilute the coating to 42% total solids content. | |

These coating colors are formulated at about 42% solids content in water and are suitable for application by air-knife coater.

When the modified pVA of the invention is used as a single coating binder, it is employed in amounts of 3–20 parts per 100 parts of pigments, and commonly 5–10 parts per 100 perts of pigments. On the other hand, when modified PVA of the invention is used in combination with other coating binders such as casein, soy protein, starch, synthetic resin emulsion or mixture thereof, it is employed in amounts 1–15 parts and 1–20 parts for other binders in proper combination which enables to maintain a practically suitable bonding strength of coating color.

The following examples show PVA of comparison to the coating composition of the invention as a control.

Example 14

| Components | Parts by Solid Weight |
|---|---|
| Kaolin | 100.0 |
| Unmodified PVA ($\bar{p}=1700$, 98–100% hydrolysis) | 5.0 |
| Dow-620 Latex | 5.0 |
| Sodium hexametaphosphate | 0.3 |
| Sufficient water to dilute the coating to 60% total solids content. | |

Example 15

| Components | Parts by Solid Weight |
|---|---|
| Kaolin | 90.0 |
| Satin white | 10.0 |
| Unmodified PVA ($\bar{p}=1700$, 98–100% hydrolysis) | 5.0 |
| Dow-620 Latex | 8.0 |
| Sodium hexametaphosphate | 0.3 |
| Sufficient water to dilute the coating to 40% total solids content. | |

Example 16

| Components | Parts by Solid Weight |
|---|---|
| Kaolin | 100.0 |
| Modified starch | 5.0 |
| Dow-620 Latex | 5.0 |
| Sodium hexametaphosphate | 0.3 |
| Sufficient water to dilute the coating to 60% total solids content. | |

Example 17

| Components | Parts by Solid Weight |
|---|---|
| Kaolin | 100.0 |
| Modified PVA ($\bar{p}=500$, 98–100% hydrolysis, total degree of substitution of 9 mol %; cyanoethyl group 3 mol %; carbamoylethyl group 1 mol % carboxyethyl group 5 mol %) | 5.0 |
| Dow-620 Latex | |
| Sodium hexametaphosphate | 0.3 |
| Sufficient water to dilute the coating to 60% total solids content. | |

In the following table, two methods are used to evaluate the benefits of the coating color of the invention. First is to actually apply the coating colors onto paper using pilot coaters which simulate application of the coating colors by the larger scale commercial coaters and thereafter evaluate the resulting coatings. Second, the IGT printability tester is used to qualitatively evaluate these coatings. This apparatus consists of a rotatable sector to which a strip of the test paper is fastened. A circular disk is arranged to rotate freely in contact with the test paper. The rotatable sector is driven by a spring or pendulum, and when released, rapidly accelerates. The coating color to be tested is applied to the disk. The disk is brought into contact with the sector which is then released and allowed to rotate. Details of this apparatus and procedure are discussed in TAP- PI, Vol. 40, October, 1957 pp 794-801. After the coating color has been applied to the test paper by the IGT apparatus, the applied coating is examined for the presence of split pattern like an orange peel. If a patternfree coating is obtained, the coating color will produce a patternfree coating on commercial equipment.

The following table further illustrates the pick resistance during printing process. The resistance test was performed in accordance with TAPPI STD. T-499, SN-64 (ink tack value 13.2, spring A, pressure 35kg), using IGT tester.

The viscosity is determined at 25°C by means of a Brookfield viscosimeter.

Table

| Ex. No. | solids (%) | viscosity (cps) | coater Type | by Pilot coater pattern | By IGT pattern | Pick Resistance (cm/sec) |
|---|---|---|---|---|---|---|
| 1 | 43 | 110 | air-knife | none | none | 175 |
| 2 | 60 | 6000 | blade | none | none | 160 |
| 3 | 60 | 3650 | roll | none | none | 165 |
| 4 | 60 | 2600 | roll | slight to none | none | 185 |
| 5 | 60 | 3000 | blade | none | none | 163 |
| 6 | 60 | 5000 | blade | slight to none | none | 170 |
| 7 | 60 | 5000 | blade | slight to none | none | 188 |
| 8 | 55 | 1100 | champflex | slight to none | none | 185 |
| 9 | 40 | 100 | air-knife | none | none | 165 |
| 10 | 40 | 120 | air-knife | none | none | 168 |
| 11 | 57 | 3500 | blade | slight to none | none | 170 |
| 12 | 42 | 160 | air-knife | none | none | 165 |
| 13 | 42 | 105 | air-knife | none | none | 185 |
| 14 | 60 | 4000 | roll | severe | severe | 190 |
| 15 | 40 | 130 | air-knife | severe | severe | 177 |
| 16 | 60 | 2500 | roll | none | none | 50 |
| 17 | 60 | 2500 | roll | none | none | 68 |

Specific embodiments of this invention have been set forth in considerable detail, However, many variations not departing from the spirit and scope of this invention will be apparent to those skilled in the art. Accordingly, it is not intended that the scope of this invention be limited except as defined in the appended claims.

What we claim are:

1. An article comprising a paper substrate having a pigment coating thereon which coating essentially contains as a coating binder a water-soluble modified polyvinyl alcohol, having an average degree of polymerization of more than 800, having at least one substituent group selected from the class consisting of cyanoethyl group, carbamoylethyl group, carboxyethyl group, sodium carboxyethyl group, potassium carboxyethyl group, ammonium carboxyethyl group, carboxymethyl group, sodium carboxymethyl group, potassium carboxymethyl group and ammonium carboxymethyl group, and wherein the said water-soluble modified polyvinyl alcohol has a total degree of substitution in the range of about 2 to 20 mol %, and wherein the said pigment is selected from the group of kaolin, clay, calcium carbonate, talc, titanium dioxide, aluminum hydroxide, satin white and mixtures thereof.

2. An article of claim 1 wherein the said water-soluble modified polyvinyl alcohol is the sole coating binder.

3. An article of claim 2 wherein the said water-soluble modified polyvinyl alcohol is contained in the amounts 3-20 parts by weight per 100 parts of pigment.

* * * * *